UNITED STATES PATENT OFFICE.

EMILE GUSTAAF MOEYS, OF NYMEGEN, NETHERLANDS.

METHOD FOR PREPARING SUBLIMATE.

1,312,743. Specification of Letters Patent. Patented Aug. 12, 1919.

No Drawing. Application filed November 4, 1918. Serial No. 261,124.

*To all whom it may concern:*

Be it known that I, EMILE GUSTAAF MOEYS, of Markt No. 6, Nymegen, Netherlands, do hereby declare the nature of this invention and in what manner the same is to be performed to be particularly described and ascertained in and by the following statement:

The invention relates to methods for preparing mercury sublimate. It will be known, that hitherto sublimate ($HgCl_2$) was obtained by dissolving mercury in sulfuric acid, by mixing the mercury-sulfate with sodium chlorid (NaCl) and by sublimating this mixture.

Now this manner of working has the disadvantage that two operations have to be performed and the residue of the sublimation treatment after each preparation must be removed and these disadvantages may be obviated by the present invention. According to this invention the mercury is mixed with hydrochloric acid and the addition of certain natural or artificial silicates, the resultant mixture being sublimated.

Now the characterizing fact of this method is that the silicates remain after the sublimation and may be used again for the same purpose, so that the preparation may be continued by adding fresh mercury and hydrochloric acid, the resultant mixture again being sublimated.

Having thus described my invention what I claim and desire to secure by Letters Patent is:—

A method for preparing sublimate, characterized by the fact that mercury is mixed with hydrochloric acid with addition of a silicate and the mixture sublimated.

In witness whereof I have hereunto set my hand in the presence of two witnesses.

EMILE GUSTAAF MOEYS.

Witnesses:
D. KLEYN,
M. ALVARADO.

Copies of this patent may be obtained for five cents each, by addressing the "Commissioner of Patents, Washington, D. C."